US011130892B2

United States Patent
Zhang et al.

(10) Patent No.: US 11,130,892 B2
(45) Date of Patent: Sep. 28, 2021

(54) OIL-BASED DUST SUPPRESSION COMPOSITION AND METHOD OF USE

(71) Applicant: Trican Well Service LTD, Calgary (CA)

(72) Inventors: Kewei Zhang, Calgary (CA); Bill O'Neil, Calgary (CA); Chuanzhong Wang, Calgary (CA); Weibing Lu, Calgary (CA); Harvey Quintero, Calgary (CA); Grant Farion, Calgary (CA)

(73) Assignee: Trican Well Service Ltd., Calgary (CA)

( * ) Notice: Subject to any disclaimer, the term of this patent is extended or adjusted under 35 U.S.C. 154(b) by 1 day.

(21) Appl. No.: 16/470,409

(22) PCT Filed: Dec. 22, 2017

(86) PCT No.: PCT/CA2017/051589
§ 371 (c)(1),
(2) Date: Jun. 17, 2019

(87) PCT Pub. No.: WO2018/112662
PCT Pub. Date: Jun. 28, 2018

(65) Prior Publication Data
US 2020/0010749 A1    Jan. 9, 2020

Related U.S. Application Data

(60) Provisional application No. 62/438,638, filed on Dec. 23, 2016.

(51) Int. Cl.
*C09K 3/22* (2006.01)
*C09D 183/04* (2006.01)

(52) U.S. Cl.
CPC .............. *C09K 3/22* (2013.01); *C09D 183/04* (2013.01)

(58) Field of Classification Search
CPC ...... C09K 3/22; C09D 183/04; C09D 123/22; C09D 183/08; C08L 83/06; C08L 83/12; C08G 77/26; C08G 77/46
See application file for complete search history.

(56) References Cited

U.S. PATENT DOCUMENTS

| | | |
|---|---|---|
| 2,399,464 A | 4/1946 | Butcher |
| 4,428,984 A | 1/1984 | Shimizu et al. |
| 4,594,268 A | 6/1986 | Kirwin |
| 4,650,598 A | 3/1987 | Roberts et al. |
| 4,780,233 A | 10/1988 | Roe |
| 4,832,702 A | 5/1989 | Kummer et al. |
| 4,981,398 A | 1/1991 | Field et al. |
| 5,240,760 A | 8/1993 | George et al. |
| 5,286,544 A | 2/1994 | Graham |
| 5,332,791 A | 7/1994 | Knoll et al. |
| 5,415,795 A | 5/1995 | Roe et al. |
| 5,595,782 A | 1/1997 | Cole |
| 5,646,215 A | 7/1997 | Lee |
| 5,741,765 A | 4/1998 | Leach |
| 5,788,879 A | 8/1998 | Ogura et al. |
| 6,132,638 A | 10/2000 | Oldenhove |
| 6,589,442 B1 | 7/2003 | Wilson et al. |
| 6,946,083 B2 | 9/2005 | Horman et al. |
| 7,388,033 B2 | 6/2008 | Nagy et al. |
| 7,658,862 B2 | 2/2010 | Talamoni |
| 8,808,574 B2 | 8/2014 | Branning |
| 8,968,462 B2 | 3/2015 | Ahrens |
| 8,968,592 B1 | 3/2015 | Falkenberg et al. |
| 9,068,106 B1* | 6/2015 | Falkenberg ............... C09K 3/22 |
| 9,523,030 B2 | 12/2016 | Zhang |
| 2012/0245276 A1 | 9/2012 | Hagadorn et al. |
| 2014/0150136 A1 | 5/2014 | Ravishankar |
| 2015/0060724 A1 | 3/2015 | Urschey et al. |
| 2015/0119301 A1 | 4/2015 | McDaniel et al. |
| 2016/0017213 A1* | 1/2016 | Zhang .................... C09K 8/805 |
| | | 507/202 |
| 2016/0251570 A1 | 9/2016 | Hook et al. |
| 2017/0037273 A1* | 2/2017 | Ali ........................ C09D 183/08 |

FOREIGN PATENT DOCUMENTS

CN    103254872 A    8/2013

OTHER PUBLICATIONS

International Search Report dated Mar. 29, 2018, issued in counterpart PCT application No. PCT/CA2017/051589.

* cited by examiner

*Primary Examiner* — Peter F Godenschwager
(74) *Attorney, Agent, or Firm* — Blank Rome LLP

(57) ABSTRACT

Methods and compositions for suppressing fugitive dust are provided herein. To suppress fugitive dust, particulate materials, dust and or substrates can be treated with a mixture having a hydrophobizing agent and an oil. The hydrophobizing agent can be an organo- or halosilane, a tallow alkylamine, an amine-functionalized polysiloxane, or an amine-functionalized hydrophobic polymer.

10 Claims, 6 Drawing Sheets

Fig. 1A  Fig. 1B
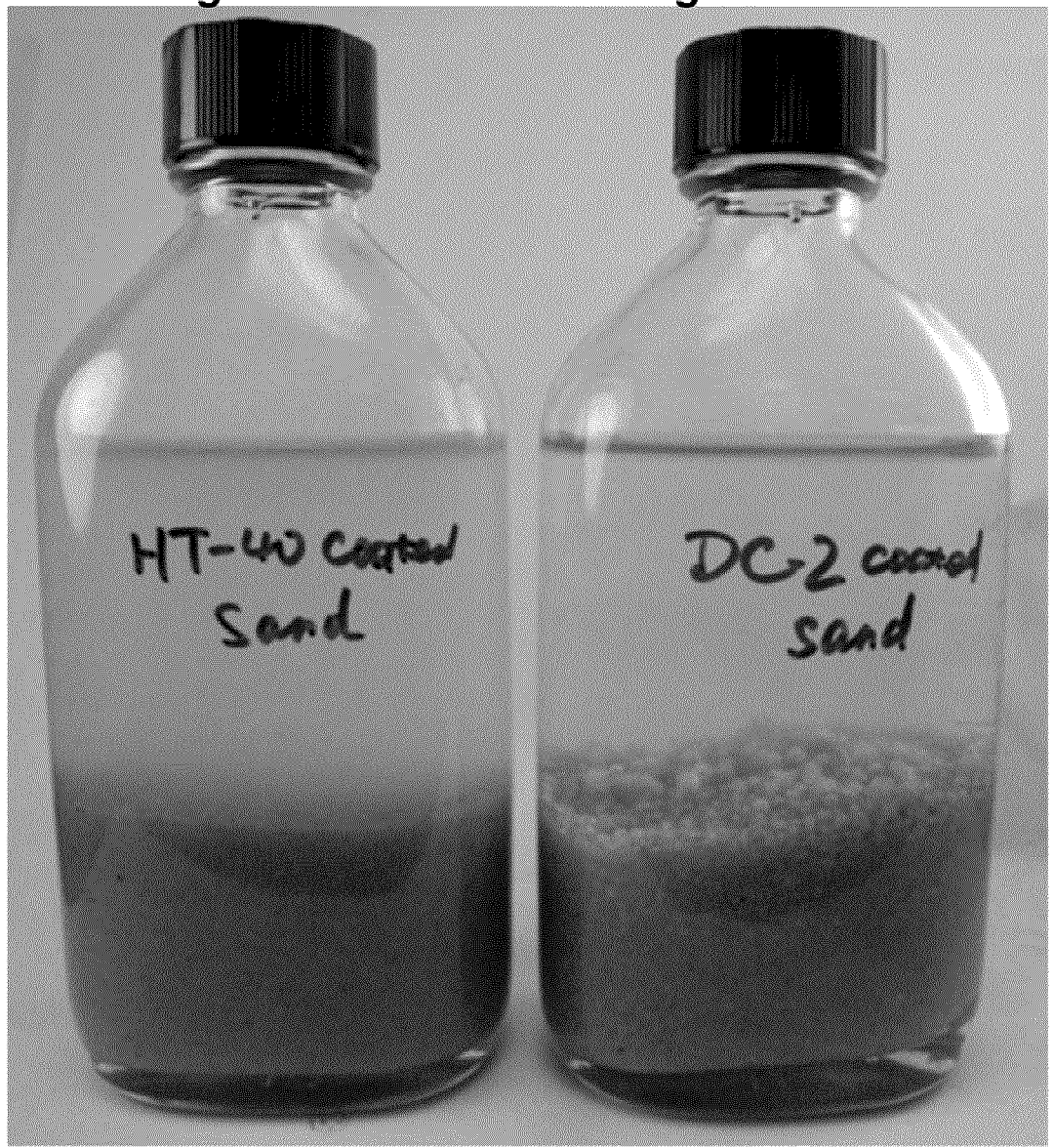
Fig. 2A  Fig. 2B
100
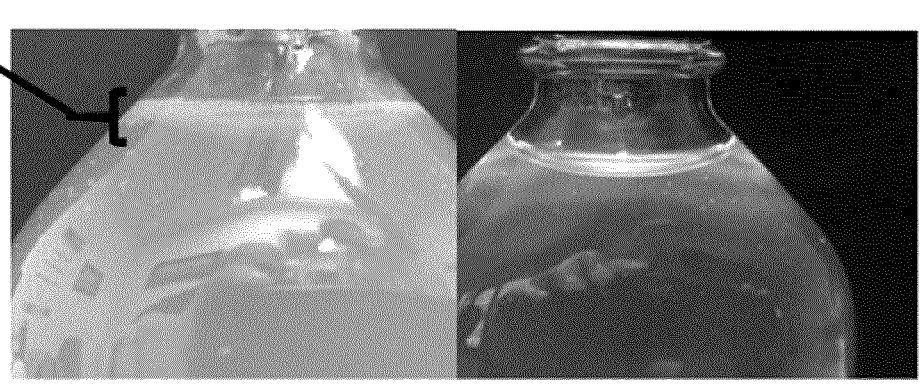

Fig. 5
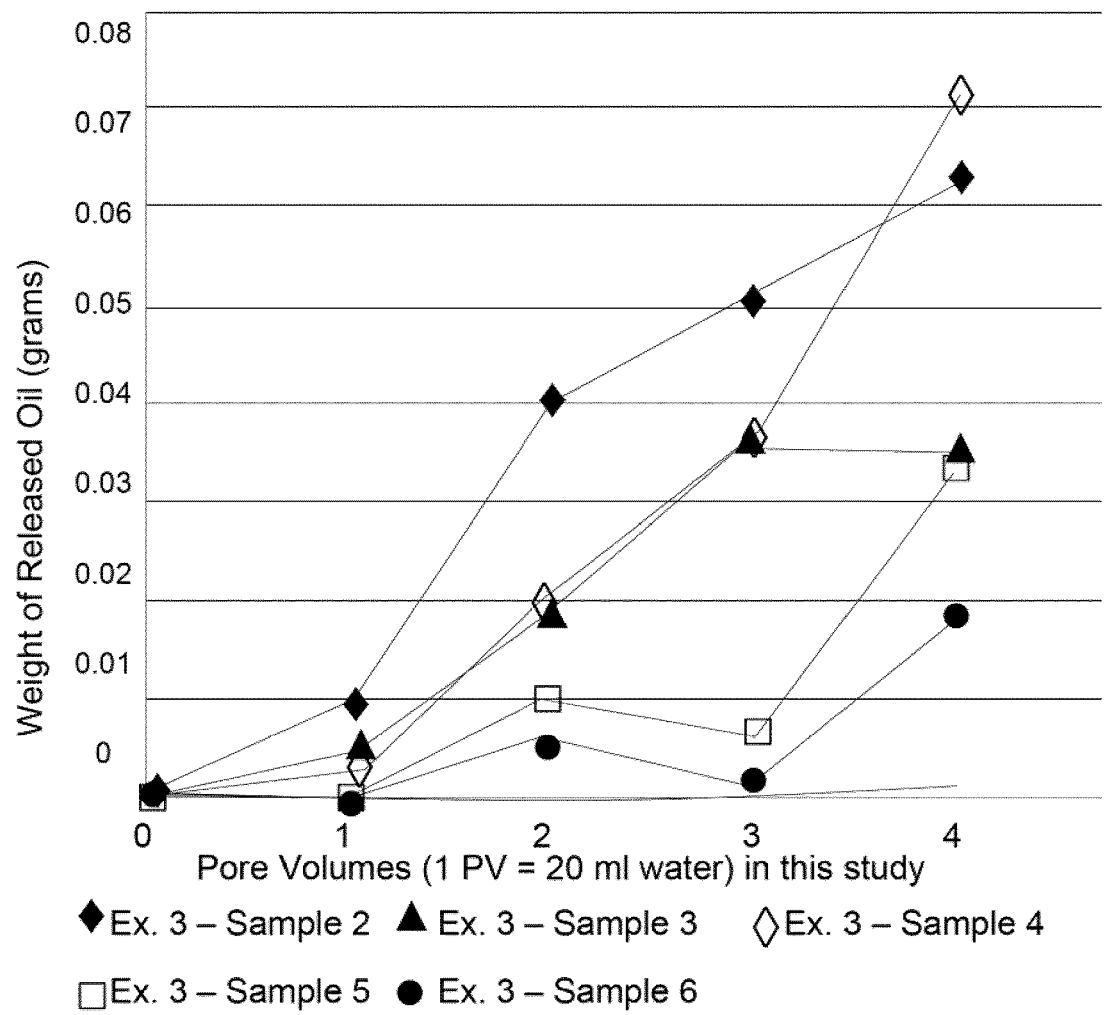
Fig. 6A  Fig. 6B
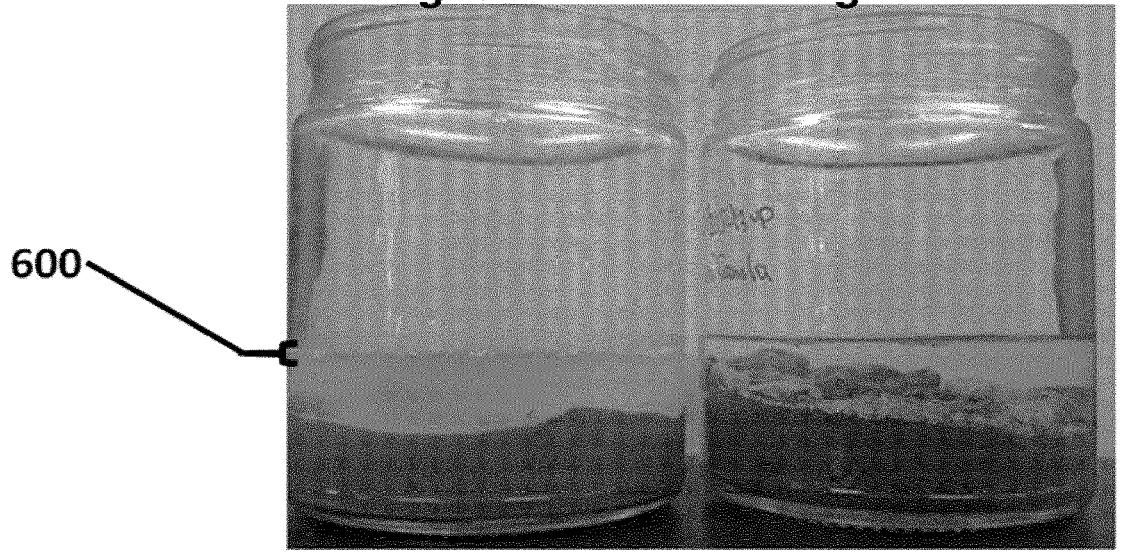

Fig. 8A     Fig. 8B     Fig. 8C
Fig. 9
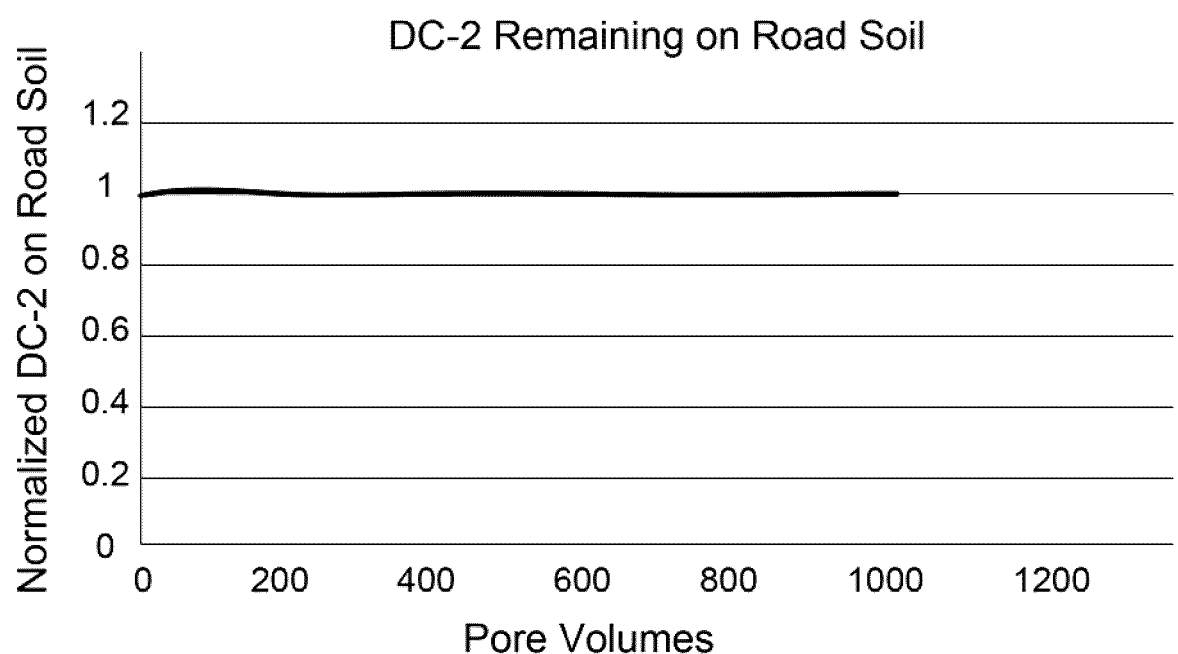

OIL-BASED DUST SUPPRESSION COMPOSITION AND METHOD OF USE

REFERENCE TO RELATED APPLICATIONS

This application claims priority based on PCT/CA2017/051589, filed Dec. 22, 2017, which in turn claims priority based on U.S. Provisional Application Ser. No. 62/438,638, filed Dec. 23, 2016, each of which are incorporated herein by reference in their entireties.

FIELD OF THE INVENTION

This disclosure relates to methods and compositions for controlling aerosolization of dust and fine materials, particularly from road surfaces.

BACKGROUND OF THE INVENTION

Fugitive dust, or dust suspended in air by wind action and/or human activities, is commonly created in many industrial activities including mining, hydraulic fracturing, sand blasting and forest logging, and has long been recognized as creating significant health, environmental and safety problems. For example, in strip mining it is not practical to pave roads at an excavation site, and when the trucks which carry the excavated materials travel over the roads they create large areas of dust which is unhealthy for workers nearby, and which can damage machinery. The control of airborne silica is a constant challenge in sand casting foundries, where large volumes of sand are used in the molding processes.

Known dust controlling methods include simply spraying water on the dust, optionally with additives such as a calcium salt (such as calcium chloride) or lignosulfonates. Oils, such as vegetable oil and petroleum oil are also used to suppress dust.

Oil suppresses dust by coating to the dust particles and sticking the dust particles to each other and to an underlying substrate such as an unpaved road. Problematically, oil applied as a dust suppressant on dust and/or underlying substrates is readily washed off by water or rain thus providing a very transient control measure. Oil run-off not only diminishes the dust-suppression ability of the oil, but also possibly contaminates the near-by water streams.

The present inventors undertook to develop compositions able to enhance the ability of oil to reduce dust release from a substrate, and to reduce the release of oil from dust and substrates, thereby improving oil's efficacy and durability as dust suppressant and reducing the impact of fugitive oil on the environment.

BRIEF DESCRIPTION OF THE OF THE DRAWINGS

FIG. 1A and FIG. 1B are imagines comparing the amount of dust particles free for suspension in water from sand treated with an oil (FIG. 1A, left) versus sand treated with an amine functionalized polysiloxane and an oil (FIG. 1B, right) in accordance with various aspects of the present disclosure;

FIG. 2A and FIG. 2B are further images illustrating the amount of oil released from soil treated with an oil (FIG. 2A, left) and soil treated with an amine functionalized polysiloxane and oil (FIG. 2B, right) in accordance with various aspects of the present disclosure;

FIG. 5 is a graphical display illustrating, the amount of oil released from soil treated with the various hydrophobizing agents and mineral oil (HT-30) of FIG. 4 in accordance with various aspects of the present disclosure;

FIG. 6A and FIG. 6B are images comparing the amount of dust particles free for suspension in water from soil treated with canola oil (FIG. 6A, left) versus soil treated with an organosilane and canola oil (FIG. 6B, right) in accordance with various aspects of the present disclosure;

Figure 3:
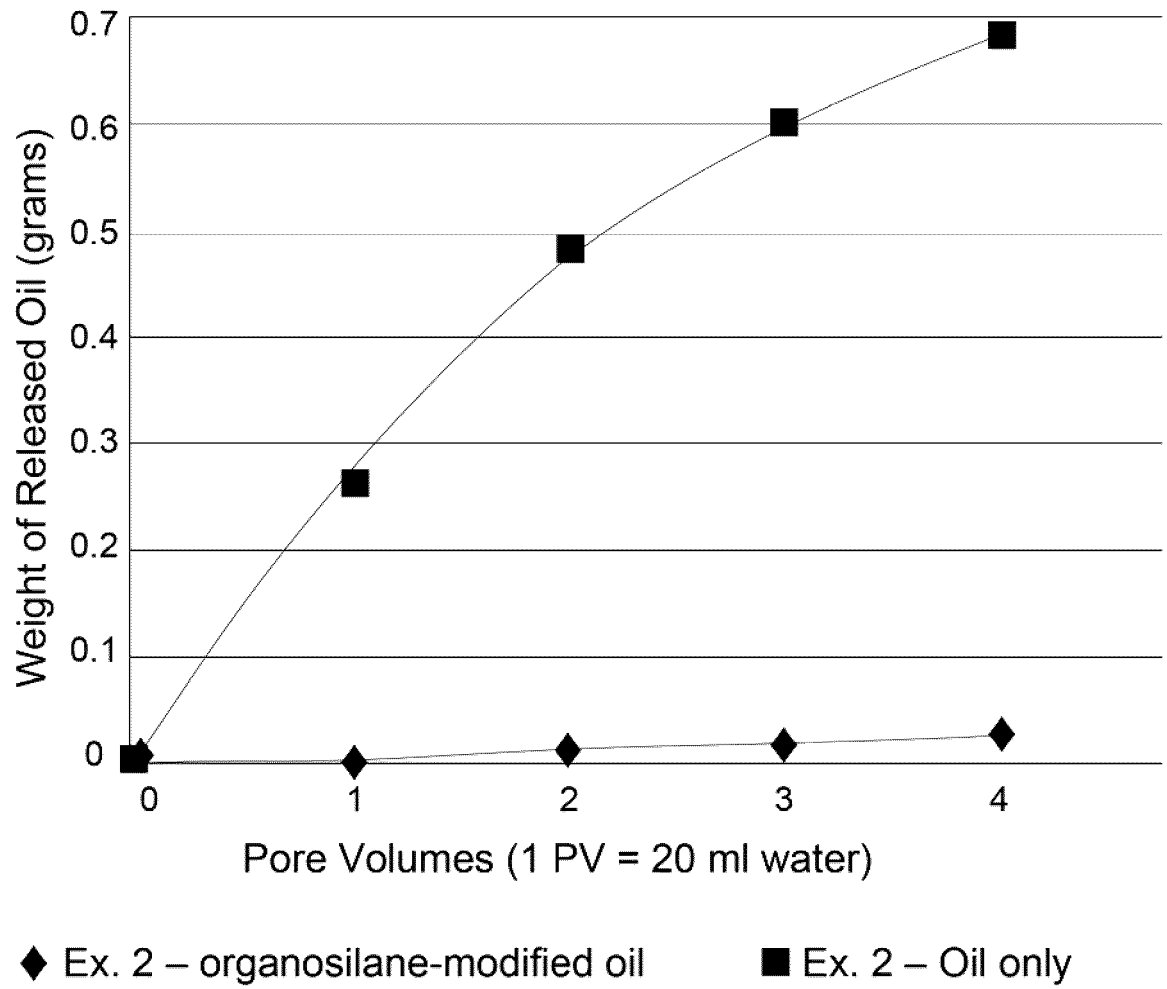
FIG. 3 is a graphical display illustrating the amount of oil released from uncoated soil treated with an oil versus soil treated with an amine functionalized polysiloxane and mineral oil in accordance with various aspects of the present disclosure.

FIG. 8A is an image comparing the amount of dust particles free for suspension in water from uncoated particulate materials, FIG. 8B is an image of particulate materials two weeks after treatment with an amine functionalized polysiloxane and oil, and FIG. 8C is an image of particulate materials five months after treatment with an amine functionalized polysiloxane and oil in accordance with various aspects of the present disclosure; and FIG. 9 is a graphical display illustrating the normalized amount of soil treatment composition (amine functionalized polysiloxane and oil) released from treated soil over 1,000 fresh water flushes.

DETAILED DESCRIPTION

The following description of the embodiments is merely exemplary in nature and is in no way intended to limit the subject matter of the present disclosure, their application, or uses.

As used throughout, ranges are used as shorthand for describing each and every value that is within the range. Any value within the range can be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as as a reasonable amount of deviation to the recited numeric values (i.e., having the equivalent function or result). For example, this term can be construed as including a deviation of ±10 percent, alternatively ±5 percent, and alternatively ±1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The term "substantially" refers to an element essentially conforming to the particular dimension, shape or other word that substantially modifies, such that the component need not be exact.

For the purposes of this specification and appended claims, the term "substrate" means the surface or material, on which dust resides or is formed, and includes a quantity of particulate materials, such as a gravel and/or dirt road surfaces.

For the purposes of this specification and appended claims, the term "particulate material" is a material that has a tendency to form dust particles when it is handled, including but not limited to dirt, sand, clay, silt, gravel and soils generally.

For the purposes of this specification and appended claims, the term "dust" as used means a fine, dry powder consisting of tiny particles of earth or waste matter, which lies on or in a substrate, or which is carried in the air. "Dust" may be emitted, for example, when transporting, handling, loading and using particulate materials, or when vehicles drive over a gravel or dirt (i.e., unpaved) roads. The compositions and methods described herein are particularly useful for suppressing or controlling the emission of road dust particularly when vehicles drive on gravel, dirt or limestone-based roads that generate dust. However, they are not intended to be limited to the control of silica dust, and may have use in other applications.

For the purposes of this specification and appended claims, the term "oil" refers to a neutral, nonpolar chemical substance that is hydrophobic (immiscible with water) and lipophilic (miscible with other oils). The term "oil" includes hydrocarbon/petroleum oil, crude oil, motor oil, mineral oil, paraffin oil, naphthenic oil, aromatic oil, recycled oil, kerosene, diesel, silicone oil, vegetable oils including without limitation corn, canola, olive, palm, castor and soybean oil, and animal derived oils. In general, any oil comprising or consisting of higher alkanes or alkenes (i.e., alkanes/alkenes having nine or more carbon atoms) may be used. Mineral oil is exemplified herein but such examples are non-limiting as to suitable oils.

For the purposes of this specification and appended claims, the term "hydrophobizing agent" refers to a chemical agent that can render a substrate hydrophobic. "Hydrophobizing agents", as used herein, are molecules having both hydrophilic (polar) and hydrophobic (nonpolar) groups. The hydrophilic group of the hydrophobizing agent has a strong affinity for a dust or a substrate having hydrophilic groups (e.g., silica and silica dust have anionic and hydroxyl groups), whereas the hydrophobic group (e.g., a hydrocarbon chain) of the hydrophobizing agent has a strong affinity for oil.

The present disclosure is directed to an improvement in dust control methods in a variety of industries including construction, mining, logging, textile manufacturing and the military. In general, any industry that utilizes roads or surfaces where particulate materials and/or dust are present may be benefitted by the subject matter of the present disclosure. This disclosure relates to the use of oil in combination with hydrophobizing agents to suppress the emission of dust from substrates such as particulate material substrates including road surfaces.

Oil is a nonpolar/hydrophobic substance, while in a majority of cases dust (such as silica/quartz) is polar/hydrophilic. Because of these contrasting properties, oil and dust have weak affinity for each other. The inventors have found that adding a hydrophobizing agent to oil enhances the efficiency of the oil when used as dust suppressant. Surprisingly, the dust suppression was found to be particularly long-lasting, more economical and more environmentally friendly than when oil was used alone.

Provided herein are dust control compositions and methods that are easy to use and are better for the environment than other known methods. Compositions in accordance with various aspect of the present disclosure may be sprayed, coated, or otherwise applied, onto dust and substrates so that the dust is less easily picked up and carried away by air currents or water. The use of compositions described herein, therefore, prevent dust from forming in the surrounding environment where it can harm individuals or equipment and pose a safety hazard. The compositions are designed to stabilize dust particles and create a longer-lasting dust free environment. Due to the ability of the compositions of the present disclosure to remain on the surfaces of dust and substrates, the requirement for re-application over time is reduced as compared to prior art dust control compositions.

Without being bound by theory, it is believed that the hydrophobizing agents bind with dust, particle materials and/or substrates to form a dust (or particulate material or substrate)/hydrophobizing agent "complex", in which the hydrophilic/polar group of the hydrophobizing agent is bound either physically (for example, by van der Waals forces or hydrogen bonding) or chemically (for example, by the formation of a covalent bond) to the dust/substrate and the hydrophobic/nonpolar group hydrophobizing agent is oriented outward and away from the surface of dust or substrate to which it is bound. Because the hydrophobic/nonpolar groups are directed outwards, the external surface of the dust/substrate becomes hydrophobic/nonpolar to an extent that permits and encourages association with oil molecules. It is believed that the oil physically binds via van der Waals forces to the hydrophobic portion of one or more dust/hydrophobizing agent complex. In essence, the hydrophobizing agent acts as a "bridge" between the dust or substrate and the oil by a physical interaction between the oil and hydrophobic/nonpolar portion of the hydrophobizing agent. The oil agglomerates the dust particles to each other and/or to the substrate, but because the oil is more tightly bound to the hydrophobic/nonpolar portion of the hydrophobizing agent than it would be to the polar surface of an unmodified dust or substrate by itself, the oil is less likely to be washed off, which improves the oil's efficiency and durability in dust suppression.

Examples of hydrophobizing agents include amine hydrophobizing agents, silane based hydrophobizing agents, and siloxane based hydrophobizing agents and amine-functionalized hydrophobic polymers. Among the different siloxane based hydrophobizing agents, polysiloxanes having primary, secondary, tertiary or quaternary amine are of particular value.

Different types of hydrophobizing agents include amines, organo- or halo-silanes, siloxanes, modified polysiloxanes including cationic polysiloxanes such as amine modified polysiloxanes, fluoro-silanes, fluoro-siloxanes, fluoro-carbon compounds. Hydrophobic polymers and amine-functionalized hydrophobic polymers having hydrophilic (polar) groups are hydrophobizing agents. A hydrophobic polymer can be any polymer that is non-wetting to water and typically has a water contact angle approximately equal to or greater than 90°. Examples of hydrophobic polymers include: (a) polyolefins, which is a class of polymers or copolymers synthesized from monomers of one or more simple olefins including ethylene, propylene and butene. Polyolefins include polyethylene, polypropylene, polybutene, polyisobutylene, poly(isoprene), poly(4-methyl-1-pentene), ethylene propylene copolymers, ethylene-propylene-hexadiene copolymers, and ethylene-vinyl acetate copolymers; (b) styrene polymers, including poly(styrene), poly (2-methylstyrene), styrene-acrylonitrile copolymers having less than about 20 mole-percent acrylonitrile; (c) vinyl polymers, such as poly(vinyl butyrate), poly(vinyl decanoate), poly(vinyl dodecanoate), poly(vinyl hexadecanoate), poly(vinyl hexanoate), poly(vinyl propionate), poly(vinyl octanoate), and poly(methacrylonitrile); (d) acrylic polymers, including poly(n-butyl acetate), poly(ethyl acrylate); methacrylic polymers, such as poly(benzyl methacrylate), poly(n-butyl methacrylate), poly(isobutyl methacrylate), poly(t-butyl methacrylate), poly(dodecyl methacrylate), poly(ethyl methacrylate), poly(2-ethylhexyl methacrylate), poly(n-hexyl methacrylate), poly(phenyl methacrylate), poly(n-propyl methacrylate), poly(octadecyl methacrylate); (e) polyesters, such as poly(ethylene terephthalate), poly (butylene terephthalate), and poly(ethylene terenaphthalate). Normally hydrophobic polymers of low or moderate molecular weight are preferred. Furthermore, hydrophobic polymers that are liquid or viscous liquid at moderate conditions are also preferred.

Amines that can be used as hydrophobizing agents can include primary fatty amines having 8 to 22 carbon atoms, for example octylamine, decylamine, dodecylamine, tetradecylamine, coconut oil amine, soybean oil amine, stearylamine, oleylamine, docosylamine. In some instances, a tallow alkylamine, a tallow alkoxyamine, a tallow amine ethoxylate, or a polyoxyethylene tallow amine can be used. In some instances, an alkylaminopropylamine such as, for example, laurylaminopropyamine, oleylaminopropylamine or tallow alkylaminopropylamine can be used as a hydrophobizing agent. In other instances, ether amines, such as, for example, lauryloxyethylamine, lauryldioxethylamine, isotridecyloxethylamine, isotridecyldioxethylamine or isotridecylpentaoxethylamine can be used as a hydrophobizing agent. In some instances, amine hydrophobizing agents of the present disclosure can have the following formula:

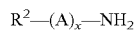

$$R^2-(A)_x-NH_2$$

where $R^2$ is a linear or branched alkyl or alkenyl radical having 8-24 carbon atoms, A is an iminopropyl group, an oxyethyl group or an oxypropyl group, and x is an integer ranging from 0 to 10.

Organosilanes (X=alkoxy such as —OCH$_3$, —OCH$_2$CH$_3$, —OCH$_2$CH$_2$CH$_3$, —O(CH$_3$)$_3$, —OCH$_2$CH$_2$OCH$_3$) that can be used as hydrophobizing agents include, but are not limited to, (CH$_3$)$_{4-n}$SiX$_n$ (n=1-3), (CH$_3$(CH$_2$)$_m$)$_{4-n}$SiX$_n$ (n=1-3, m=1-23), (C$_6$H$_5$)$_{4-n}$SiX$_n$=1-3), CH$_3$HSiX$_2$, CH$_3$H$_2$SiX, (H$_2$C=CH)$_{4-n}$SiX$_n$ (n=1-3), (H$_2$C=CH—(CH$_2$)$_m$)$_{4-n}$SiX$_n$ (n=1-3, m=1-23), (HC≡C)$_{4-n}$SiX$_n$ (n=1-3), (HC≡C—(CH$_2$)$_m$)$_{4-n}$SiX$_n$ (n=1-3, m=1-23), R$_{4-n}$SiX$_n$ (n=1-3, each R independently=a cyclic hydrocarbon or a branched alkane such as a isopropyl, iso-, tert-, or sec-butyl, iso-, tert-, or sec-pentyl, iso-, tert-, or sec-hexyl, iso-, tert-, or sec-heptyl, iso-, tert-, or sec-octyl, etc.), (RC$_5$H$_5$)$_{4-n}$SiX$_n$ (n=1-3, R=a hydrophobic group such as, but not limited to, a C$_1$-C$_{24}$ saturated or unsaturated, branched or linear alkyl group, F, a vinyl, an alkoxy, an aromatic hydrocarbon, a cyclic hydrocarbon, etc.) In some instances, organosilanes comprising long alkyl chains (i.e. C$_8$-C$_{24}$), such as octyl, dodecyl, hexadecyl, and octadecyl are used.

Halosilanes (where X=Cl, Br, I of F; preferably Cl or Br) that can be used as hydrophobizing agents include, but are not limited to, (CH$_3$)$_{4-n}$SiX$_n$, (n=1-3), (CH$_3$(CH$_2$)$_m$)$_{4-n}$SiX$_n$ (n=1-3, m=1-23), (C$_6$H$_5$)$_{4-n}$SiX$_n$ (n=1-3), CH$_3$HSiX$_2$, CH$_3$H$_2$SiX, (H$_2$C=CH)$_{4-n}$SiX$_n$ (n=1-3), (H$_2$C=C—(CH$_2$)$_m$)$_{4-n}$SiX$_n$ (n=1-3, m=1-23), (HC≡C)$_{4-n}$SiX$_n$ (n=1-3), (HC≡C—(CH$_2$)$_m$)$_{4-n}$SiX$_n$ (n=1-3, m=1-23), R$_{4-n}$SiX$_n$ (n=1-3, each R independently=a cyclic hydrocarbon or a branched alkane such as a isopropyl, iso-, tert-, or sec-butyl, iso-, tert-, or sec-pentyl, iso-, tert-, or sec-hexyl, iso-, tert-, or sec-heptyl, iso-, tert-, or sec-octyl, etc.), (RC$_5$H$_5$)$_{4-n}$SiX$_n$ (n=1-3, R=a hydrophobic group such as, but not limited to, a C$_1$-C$_{24}$ saturated or unsaturated, branched or linear alkyl group, F, a vinyl, an alkoxy, an aromatic hydrocarbon, a cyclic hydrocarbon, etc.). In some instances, halosilanes comprising long alkyl chains, such as octyl, dodecyl, hexadecyl, and octadecyl are used.

In accordance with various embodiments of the present disclosure, silane or siloxane modified polymers can be used as a hydrophobizing agent. Silane or siloxane modified polymers can include silicone-modified polyolefins or polyacrylics and their respective copolymers, where a silane or siloxane having one or more hydrolysable alkoxyl group, or siloxane groups including cationic siloxane group, are attached to the polymer chain either at middle or end or both. Examples of silane-modified hydrophobic polymers, by way of illustration only, include: (a) silane-modified polyolefin including silane-modified polybutylenes, silane-modified polyisobutylenes, silane-modified polyethylenes, silane-modified olefin copolymer and silane-modified polypropylenes and their copolymers; (b) silane-modified styrene polymers; (c) silane-modified vinyl polymers; (d) silane-modified acrylate polymers including silane-modified poly (t-butyl methacrylate), poly(t-butylaminoethyl methacrylate); and (e) silane-modified polyesters. Especially preferred are silane-modified polyolefins including mono/homo and copolymers such as polyethylene and polypropylene, and copolymers of ethylene-propylene, ethylene-butene, ethylene-hexene, ethylene-vinyl-acetate, vinyl-acetate, ethylene-methyl-acrylate, ethylene-ethyl-acrylate and ethylene-butyl-acrylate. In some instances, silane-modified polymers or copolymers can be prepared in the form of an aqueous dispersion.

Without being bound to theory, it is believed that organosilanes and halosilanes undergo a hydrolysis and condensation reaction with silanols located on silica surfaces of particulate materials, dust or substrates to form a covalent bond between the silicon portion of the silane and the silica surfaces. In the case of organosilanes, an alcohol is formed as a reaction byproduct from the hydrogen of the silanol and the alkoxy groups of the organosilane. In the case of halosilanes, an acid is formed as a reaction byproduct from the hydrogen of the silanol and the halogens of the halosilane.

Amine functionalized hydrophobic polymers are hydrophobic polymers that are functionalized by attaching one or more organic amine groups or derivatives thereof to the polymer chain, either at the end or middle of the polymer chain or both. Different organic amines or derivatives thereof can be grafted to the hydrophobic polymers including, for example, organic primary, secondary, tertiary or quaternary amine or its derivatives. The presence of the amine group allows the polymers to more effectively physically or chemically adsorb to surfaces of dust, substrates or particulates such as sand. Examples of amine functionalized hydrophobic polymers include: (a) primary, secondary, tertiary or quaternary amine- functionalized polyolefins such as polybutyl amine, polyisobutylene amine, polyisobutylene succinimide, amine-functionalized polyethylenes and amine-functionalized polypropylenes; (b) primary, secondary, tertiary or quaternary amine-functionalized styrene polymers such as polystyrene amine, copolymers of styrene and dimethylamino propylamine maleimide; (c) primary, secondary, tertiary or quaternary amine-functionalized vinyl polymers; (d) primary, secondary, tertiary or quaternary amine-functionalized acrylic polymers such as amine functionalized poly(t-butyl methacrylate), poly(t-butylaminoethyl methacrylate); and (e) primary, secondary, tertiary or quaternary amine-functionalized polyesters. Examples of these polymers have been disclosed in various patents, which are incorporated herein by reference in their entirety, including U.S. Pat. Nos. 4,832,702; 5,332,791; 5,646,215; 7,388,033 and US Publication No. 2012/0245276. Furthermore, in some cases, the primary, secondary, tertiary or quaternary amine-functionalized hydrophobic polymers contain reactive groups which can be used to crosslink covalently with each other or with other organic molecules in the compositions or with the particulate surfaces.

In some instances, a primary, secondary, tertiary or quaternary amine-functionalized polysiloxane can be used as a hydrophobizing agent. In some embodiments, an amine-functionalized polysiloxane having the following chemical structure is used:

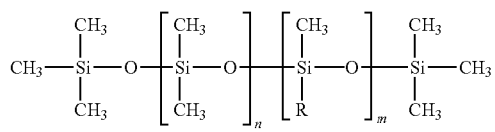

where R is an aminoalkyl group comprising a $C_1$-$C_{24}$ alkyl or alkenyl and a one or more primary, secondary, tertiary or quaternary amines, n is an integer ranging typically from 3-1000, and more typically from 10-500 and more typically from 20 to 200 and m is an integer ranging from 1-100, and more typically from 1 to 50. In some instances, R is an aminoethylaminopropyl group and the functionalized polysiloxane has a silicone content of 95% and viscosity of 4,500 cps (AF-23, Wacker Chemie AG). Another example of an amine-functionalized polysiloxane is an amino polydimethylsiloxane (AF-21, Wacker Chemie AG, having a silicone content of 90% and viscosity of 2,000 cps). In some embodiments, an amine-functionalized polysiloxane having the following chemical structure is used:

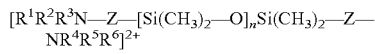

where $R^1$, $R^2$, $R^3$, $R^4$, $R^5$ and $R^6$ are independently alkyl or hydrogen, Z is —$CH_2$—CHOH—$CH_2O$—$(CH_2)_3$— and n is 1-200. In some instances, amine-functionalized polysiloxane characterized by n=10 (TEGOPREN 6920), n=30 (TEGOPREN 6922) and n=80 (TEGORPREN 6924), are utilized.

Without being bound to theory, it is believed that amine functional polysiloxane hydrophobizing agents having primary, secondary or tertiary amines are physically bound to silica surfaces of particulate materials, dust or substrates by hydrogen bonding between hydrogens of surface silanols and the lone pair of ions of the primary, secondary or tertiary amines. Also without being bound to theory, it is believed that amine functional hydrophobizing agents having a quaternary amine with at least one hydrogen are physically bound to surfaces of particulate materials, dust or substrates by hydrogen bonding between the quaternary amine hydrogen and regions of high electron density or negative charge on said particulate material, dust or substrate surface. Also without being bound to theory, it is believed that amine functional hydrophobizing agents having a quaternary amine with no hydrogens are physically bound to surfaces of particulate materials, dust or substrates by electrostatic attraction between the quaternary amine and regions of high electron density or negative charge on said particulate material, dust or substrate surface.

In some instances, particulate materials can be treated with a composition comprising an oil and a hydrophobizing agent, and the treated particulate materials can subsequently be applied onto a substrate. First, the composition is formed by mixing a hydrophobizing agent with an oil. The hydrophobizing agent can be mixed with the oil such that the concentration of hydrophobizing agent in the oil is less than about 10 wt %, alternatively less than about 8 wt%, alternatively less than about 6 wt %, alternatively about 4 wt % or less, and alternatively about 2 wt. % or less. In accordance with various aspects of the present disclosure, the hydrophobizing agent is mixed with an oil such that the concentration of hydrophobizing agent in the oil between about 2 wt % and about 4 wt %. Next, particulate materials are treated with the composition. The particulate materials can be treated with the composition at a concentration ranging from about 0.1 liters (L) to about 5 L of mixture per ton of particulate material (about 0.1 L/ton to about 5 L/ton), alternatively about 0.2 L/ton to about 4 L/ton, alternatively about 0.3 L/ton to about 3 L/ton, alternatively about 0.4 L/ton to about 2 L/ton, alternatively about 0.5 L/ton, to about 1.5 L/ton, alternatively 0.6 L/ton to about 1 L/ton, alternatively about 0.7 L/ton to about 0.9 L/ton, and alternatively about 0.8 L/ton. The particulate materials can be treated while in a pile, in a container, on a conveyor system, in an agitating or shaking reaction vessel, etc. When the particulate materials are in a pile or on a conveyor system, the composition can be spray or otherwise coated onto the particulate materials. When the particulate materials are in a container or reaction vessel, an amount of the composition can be placed in the container or reaction vessel for a predetermined period of time sufficient for the hydrophilic portion of the hydrophobizing agent to physically or chemically bind to the particulate materials and hydrophobic portion of the hydrophobizing agent to physically bind to the oil. If needed, the unreacted composition can then be removed from the container or vessel by a separation process such as for example, decantation or filtration, leaving hydrophobizing agent/oil-coated particulate materials in the container or vessel. The hydrophobizing agent/oil-coated particulate materials can then be applied onto a substrate such as a road, a pathway, a work or construction site, a shop yard, a patch of land, etc.

In some instances, particulate materials can be treated with a hydrophobizing agent. After treatment, the hydrophobizing agent-treated particulate materials can applied onto a substrate such as a road, a pathway, a work or construction site, a shop yard, a patch of land, etc. After the hydrophobizing agent-treated particulate materials are applied onto the substrate, the hydrophobizing agent-treated particulate materials and substrate can be treated with an oil. First, particulate materials are placed in a pile, in a container, on a conveyor system, in an agitating or shaking reaction vessel, etc. Next, particulate materials are treated with the hydrophobizing agent. When the particulate materials are in a pile or on a conveyor system, the hydrophobizing agent can be sprayed or otherwise coated onto the particulate materials. When the particulate materials are in a container or reaction vessel, an amount of the hydrophobizing agent (neat or in a solvent or solvent system) can be placed in the container or reaction vessel for a predetermined period of time sufficient for the hydrophilic portion of the hydrophobizing agent to physically or chemically bind to the particulate materials. If needed, the unreacted hydrophobizing agent can then be removed from the container or vessel by a separation process such as for example, decantation or filtration, leaving hydrophobizing agent-coated particulate materials in the container or vessel. Next, the hydrophobizing agent-treated particulate materials can be applied onto a substrate such as a road, a pathway, a work or construction site, a shop yard, a patch of land, etc. After the hydrophobizing agent-treated particulate materials are applied onto the substrate, the hydrophobizing agent-treated particulate materials and substrate can be treated with an oil. The oil can be applied to the hydrophobizing agent-treated particulate materials and substrate by a process such as, for example spray coating.

In some instances, particulate materials and a substrate may separately be treated with a hydrophobizing agent. After treatment, the hydrophobizing agent-treated particulate materials may be applied onto the hydrophobizing agent-treated substrate. After the hydrophobizing agent-treated particulate materials are applied to the hydrophobizing agent-treated substrate, the particulate materials and substrate may be treated with an oil. First, particulate materials are placed in a pile, in a container, on a conveyor system, in an agitating or shaking reaction vessel, etc. Next, particulate materials are treated with the hydrophobizing agent. When the particulate materials are in a pile or on a conveyor system, the hydrophobizing agent is be spray or otherwise coated onto the particulate materials. When the particulate materials are in a container or reaction vessel, an amount of the hydrophobizing agent (neat or in a solvent or solvent system) may be placed in the container or reaction vessel for a predetermined period of time sufficient for the hydrophilic portion of the hydrophobizing agent to physically or chemically bind to the particulate materials. As needed, the unreacted hydrophobizing agent can then be removed from the container or vessel by a separation process such as for example, decantation or filtration, leaving hydrophobizing agent-coated particulate materials in the container or vessel. Next, the substrate may be treated with a hydrophobizing agent by a process such as, for example, spray or otherwise coating the substrate with the hydrophobizing agent. Then, the hydrophobizing agent-coated particulate materials may be spread or otherwise applied onto the hydrophobizing agent-coated substrate. Finally, the hydrophobizing agent-coated particulate materials and hydrophobizing agent-coated substrate may be treated with an oil by a process such as, for example, spray or otherwise coating the hydrophobizing agent-coated particulate materials and hydrophobizing agent-coated substrate with the oil.

In some instances, particulate materials and/or dust can be located on a substrate and the particulate materials, dust and substrate can be treated at the same time with a composition comprising an oil and a hydrophobizing agent. First, the hydrophobizing agent is mixed with an oil such that the concentration of hydrophobizing agent in the oil is less than about 10 wt %, alternatively less than about 8 wt %, alternatively less than about 6 wt %, alternatively about 4 wt % or less, and alternatively about 2 wt % or less. In accordance with various aspects of the present disclosure, the hydrophobizing agent is mixed with an oil such that the concentration of hydrophobizing agent in the oil between about 2 wt % and about 4 wt %. Then the hydrophobizing agent/oil mixture is sprayed or otherwise coated onto the particulate materials, dust and/or substrate in an amount of about 0.1 L to about 5 L of mixture per square meter of substrate (0.1-5 L/m$^2$), alternatively about 0.2 L/m$^2$ to about 4 L/m$^2$, alternatively about 0.2 L/m$^2$ to about 3 L/m$^2$, alternatively about 0.3 L/m$^2$ to about 2.5 L/m$^2$, alternatively about 0.4 L/m$^2$ to about 2 L/m$^2$, alternatively about 0.5 L/m$^2$ to about 2 L/m$^2$, alternatively about 0.5 L/m$^2$ to about 1.5 L/m$^2$, alternatively about 0.5 L/m$^2$ to about 1 L/m$^2$, alternatively about 0.6 L/m$^2$ to about 0.9 L/m$^2$, alternatively about 0.7 L/m$^2$ to about 0.8 L/m$^2$, and alternatively about 0.75 L/m$^2$.

In some instances, particulate materials and/or dust can be located on a substrate and the particulate materials, dust and substrate can be treated a hydrophobizing agent. Subsequently the hydrophobizing agent-treated particulate materials, hydrophobizing agent-treated dust and hydrophobizing agent-treated substrate can be treated with an oil.

In some instances, a composition comprising an oil and a hydrophobizing agent is applied to the particulate materials as they are being handled (e.g., as they are transferred from one container to another or as they are deposited onto a road surface). In some instances, a composition comprising an oil and a hydrophobizing agent is applied to particulate materials prior to being stored or transported. In either instance, the concentration of hydrophobizing agent in the oil can be less than about 10 wt %, alternatively less than about 8 wt %, alternatively less than about 6 wt %, alternatively about 4 wt % or less, and alternatively about 2 wt % or less. In accordance with various aspects of the present disclosure, the hydrophobizing agent is mixed with an oil such that the concentration of hydrophobizing agent in the oil between about 2 wt % and about 4 wt %. Also in either instance, the particulate materials can be treated with the composition at a concentration ranging from about 0.1 liters (L) to about 5 L of composition per ton of particulate material (about 0.1 L/ton to about 5 L/ton), alternatively about 0.2 L/ton to about 4 L/ton, alternatively about 0.3 L/ton to about 3 L/ton, alternatively about 0.4 L/ton to about 2 L/ton, alternatively about 0.5 L/ton, to about 1.5 L/ton, alternatively about 0.6 L/ton to about 1 L/ton, alternatively about 0.7 L/ton to about 0.9 L/ton, and alternatively about 0.8 L/ton.

In the above, particulate materials, dust and substrates are preferably dry or substantially dry prior to treating with a hydrophobizing agent or a hydrophobizing agent/oil mixture.

In some instances the oil and hydrophobizing agent are mixed with other agents such as water, calcium or lignosulfonates prior to application onto particulate materials, dust and/or substrates. In some embodiments the oil and hydrophobizing agent are mixed with other agents such as water, calcium or lignosulfonates to form an emulsion prior to application onto particulate materials, dust and/or substrates.

EXAMPLES

The Examples provided below are merely exemplary and should not be construed as limiting the appended claims in any way. Furthermore, one of ordinary skill in the art will appreciate that certain preparative variables or experimental parameters may be modified without departing from the scope of the examples or the subject matter of the present disclosure.

In some of the examples below a modified standard method EPA 1664 is utilized. Generally, the method is performed as follows. First, a 20 mL sample is acidified to pH<2 and serially extracted three times with n-pentane (from Fisher Chemical, purity >99%) in a separatory funnel. The solvent is then evaporated from the extract at 40° C. and the residue is weighed. Quality is assured through calibration and testing of the extraction, distillation and gravimetric systems.

Example 1

The following is a representative example of one embodiment of a composition and method for controlling fugitive dust. In this example, Dust Control Chemical DC-2 was used which comprises 4 wt % amine functionalized polysiloxane (AF-23, Wacker Chemie AG) and 96 wt % mineral oil HT-40. HT-40 is a blend of synthetic isoalkane fluid and severely hydrocracked low toxicity mineral oil produced by Petro-Canada. HT-40 is clear, virtually non-toxic and biodegradable oil having a trout toxicity, $LC_{50}$ at 96 hours of >500,000mg/ml. In a first beaker, 100 grams of API mesh size 30/50 sand was mixed with 0.1 mL of HT-40 to form a mineral oil-coated sand. The coated sand was transferred into a first 6-oz glass bottle to which 100 mL of distilled water was added. The bottle was shaken for one minute. In a second beaker, 100 grams of 30/50 sand was mixed with 0.1 mL of DC-2 to form a DC-2 coated sand. The coated sand was transferred into a second 6-oz glass bottle to which 100 mL of distilled water was added. The bottle was shaken for one minute.

The two bottles were left undisturbed for 5 minutes. After that time, in the first bottle, a layer of oil was observed to be floating on the top of water, and the water was cloudy (FIG. 1A and FIG. 2A, left bottles); while in the second bottle, the water was clear, with no layer of oil on top (FIG. 1B and FIG. 2B, right bottle). In FIG. 2A and FIG. 2B, water was added to neck of each bottle for ease of viewing the oil layer 100 in the first bottle (HT-40) and the lack thereof in right bottle (DC-2).

Example 2

In this example, two samples were prepared for comparison of amounts of oil released from treated soils over multiple cycles of subjecting the treated sand to water.

The first sample is a comparative soil. 100 grams of local road soil was mixed with 2.0 grams of a synthetic oil (Risella X415 from Royal Dutch Shell plc, which is a synthetic white oil derived from a Gas-to-Liquids process. Risella X415 is highly saturated with a high degree of iso-paraffinic structures, specifically $C_{18}$-$C_{50}$ branched, cyclic and linear distillates, density=806 kg/m³, flash point=200° C.) and left open to air for one hour at room temperature. After the one hour period, 40 mL of tap water was added and slowly mixed with the synthetic oil-treated road soil. The water appeared muddy with an oil layer forming on top of the water.

The second sample is an organosilane-modified soil. 100 grams of local road soil was mixed with 2.0 grams of a mixture having 2 wt % hexadecyltrimethoxysilane (Wacker Chemie AG) and 98 wt % mineral oil (Risella X415 from Royal Dutch Shell plc). The mixture was left open to air for one hour at room temperature. After the one hour period, 40 mL of tap water was added and slowly mixed with the mineral oil-treated road soil. The water appeared very clear and there was no oil layer on top of it.

The following procedure was conducted to determine the amount of oil released from each sample over multiple cycles of subjecting to water. 20 mL (1 pore volume) of water was decanted into a beaker and the amount of released oil in the water was measured using gravimetric analysis based on standard method EPA 1664, through acidizing water sample to pH 2. Then the sample was extracted 3 times with pentane and the extracts were combined and dried. The sample was then washed with 20 mL of water and the above procedure was repeated over multiple cycles. The released oil was determined for each sample at each wash cycle (FIG. 3). As can be seen, the soil treated with only synthetic oil lost about 0.68 grams of oil after only four water washings, constituting about 35% of the amount of synthetic oil originally added to the soil (2.0 grams). The soil treated with the mineral oil containing 2 wt % hexadecyltrimethoxysilane, on the other hand, exhibited a minimal loss of 0.2 g of mineral oil over four water washings.

Example 3

Figure 4:
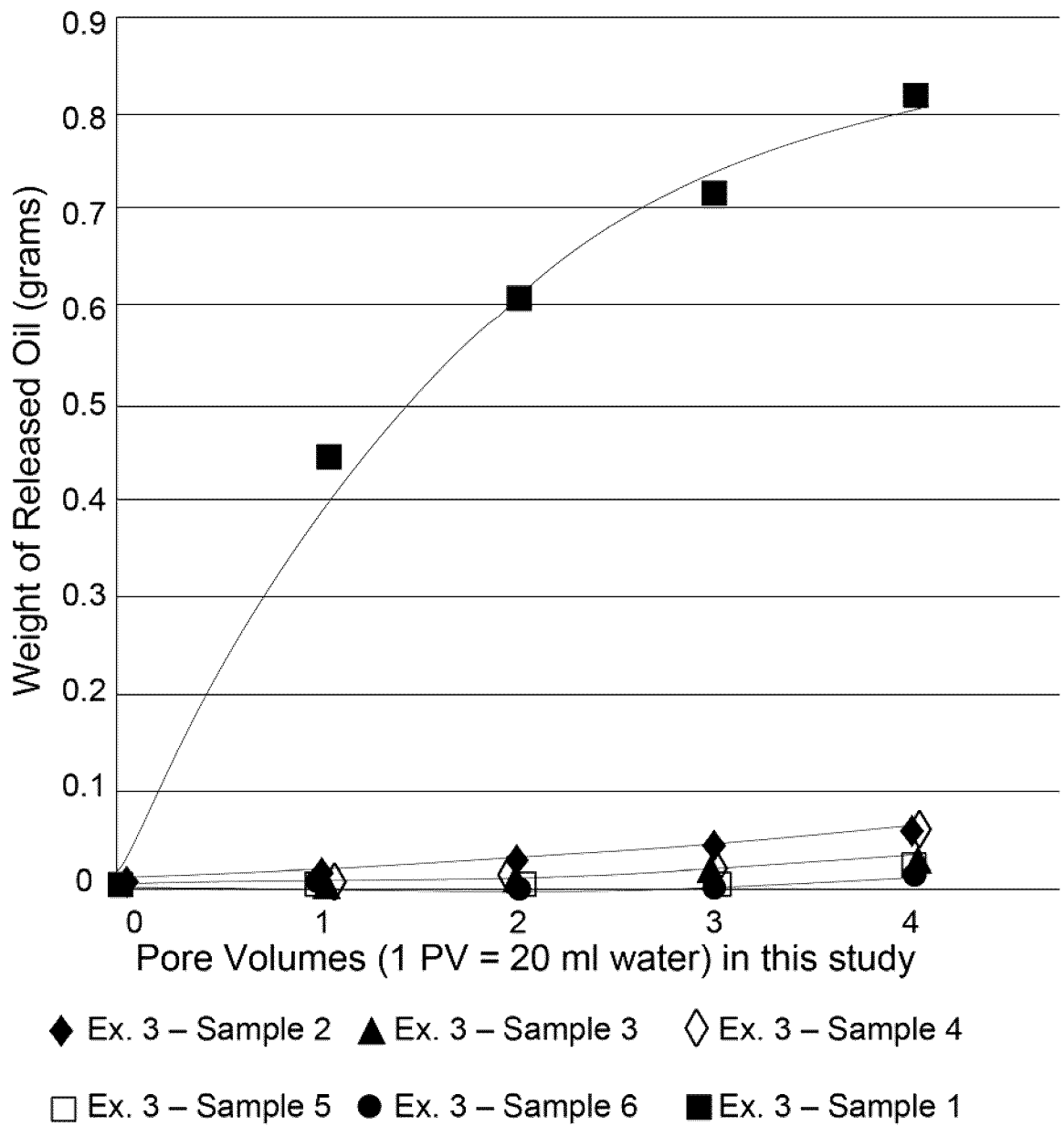
FIG. 4 is a graphical display illustrating the amount of oil released from soil treated with an oil versus soil treated with various hydrophobizing agents and mineral oil (HT-30) in accordance with various aspects of the present disclosure.

In this example, six samples were prepared for comparison of amounts of oil released from treated soils over multiple cycles of subjecting to water with the results shown in FIG. 4.

Sample 1—Comparative sample. 100 grams of local road soil was mixed with 2.0 grams of mineral oil (HT-30, Petro-Canada. HT-30 is another blend of synthetic isoalkane fluid and severely hydrocracked low toxicity mineral oil produced by Petro-Canada. HT-30 is clear, virtually non-toxic and biodegradable oil having a trout toxicity, $LC_{50}$ at 96 hours of >500,000mg/ml) and left open to air for one hour at room temperature. After the one hour period, 40 mL of tap water was added and slowly mixed with the mineral oil-treated road soil. The water appeared muddy with an oil layer forming on top of the water.

Sample 2—amine functionalized polysiloxane. 100 grams of local road soil was mixed with 2.0 grams of a mixture having 4 wt % of AF-23 (Wacker Chemie AG) and 96 wt % HT-30 mineral oil. The mixture was left open to air for one hour at room temperature. After the one hour period, 40 mL of tap water was added and slowly mixed with the mineral oil-treated road soil. The water appeared very clear and there was no oil layer on top of it.

Sample 3—Tallow alkylamine. 100 grams of local road soil was mixed with 2.0 grams of a mixture having 4 wt % of a tallow alkylamine (Genamin TA 100, Clariant Produkte (Deutschland) GmbH) and 96 wt % HT-30 mineral oil. The mixture was left open to air for one hour at room temperature. After the one hour period, 40 mL of tap water was added and slowly mixed with the mineral oil-treated road soil. The water appeared very clear and there was no oil layer on top of it.

Sample 4—Ammonium-functionalized polysiloxane. 100 grams of local road soil was mixed with 2.0 grams of a mixture having 4 wt % of an ammonium-functionalized polysiloxane (TEGOPREN 6924, Evonik Industries AG) and 96 wt % HT-30 mineral oil. The mixture was left open to air for one hour at room temperature. After the one hour period, 40 mL of tap water was added and slowly mixed with the mineral oil-treated road soil. The water appeared very clear and there was no oil layer on top of it.

Sample 5—Alkylamine-functionalized polyisobutylene (PIB) polymer. 100 grams of local road soil was mixed with 2.0 grams of a mixture having 4 wt % of an alkylamine-functionalized PIB polymer (BASF Corporation) and 96 wt % HT-30 mineral oil. The mixture was left open to air for one hour at room temperature. After the one hour period, 40 mL of tap water was added and slowly mixed with the mineral oil-treated road soil. The water appeared very clear and there was no oil layer on top of it. Alkylamine-functionalized PIB polymers can be characterized as having the following chemical formula:

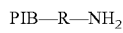

PIB—R—NH$_2$ where R is a C$_3$ to C$_{12}$ carbon chain comprising at least one alkene group.

Sample 6—Organosilane. 100 grams of local road soil was mixed with 2.0 grams of a mixture having 2 wt % hexadecyltrimethoxysilane (Wacker Chemie AG) and 98 wt % HT-30. The mixture was left open to air for one hour at room temperature. After the one hour period, 40 mL of tap water was added and slowly mixed with the mineral oil-treated road soil. The water appeared very clear and there was no oil layer on top of it.

The following procedure was conducted to determine the amount of oil released from each sample of Example 3 over multiple cycles of subjecting to water. 20 mL (1 pore volume) of water was decanted into a beaker and the amount of released oil in the water was measured using gravimetric analysis based on standard method EPA 1664, through acidizing water sample to pH 2. Then the sample was extracted 3 times with pentane and the extracts were combined and dried. The sample was then washed with 20 mL of water and the above procedure was repeated over multiple cycles. The released oil was determined for each sample at each wash cycle (FIG. 4). As can be seen, the soil treated with only HT-30 mineral oil lost about 0.83 grams of oil after only four water washings, constituting about 43% of the amount of mineral oil originally added to the soil (2.0 grams). Samples 2-6, on the other hand, exhibited minimal losses of mineral oil over four water washings. FIG. 5 is a graphical display illustrating the amount of oil released from soil samples 2-6. Like FIG. 4, the y-axis is in units of weight of released oil (gram) and the x-axis is in number of pore volumes. For the sake of clarity, the data for samples 2-6 are the same in both FIGS. 4 and 5.

Example 4

The following is a representative example of one embodiment of a composition and method for controlling fugitive dust. In this example, a mixture comprising 2 wt % hexadecyltrimethoxysilane (Wacker Chemie AG) and 98 wt % canola oil was use. In a first beaker, 100 grams of API mesh size 30/50 sand was mixed with 0.1 mL of canola oil to form a canola oil-coated sand. The coated sand was transferred into a first 6-oz glass bottle to which 100 mL of distilled water was added. The coated sand was transferred into a first 6-oz glass bottle to which 100 mL of distilled water was added. The bottle was shaken for one minute. In a second beaker, 100 grams of 30/50 sand was mixed with 0.1 mL of the hexadecyltrimethoxysilane/canola oil mixture to form hexadecyltrimethoxysilane coated sand. The hexadecyltrimethoxysilane coated sand was transferred into a second 6-oz glass bottle to which 100 mL of distilled water was added. The bottle was shaken for one minute.

The two bottles were left undisturbed for 5 minutes. After that time, in the first bottle, a layer of oil 600 was observed to be floating on the top of water, and the water was cloudy (FIG. 6A, left bottle); while in the second bottle, the water was clear, with no layer of oil on top (FIG. 6B, right bottle).

Example 5—Road Testing

In this example, Dust Control Chemical DC-2 (example 1) was applied onto a portion of a dry dirt road using a spray bar. The portion of dirt road was coating using a loading of about 0.75 Liters of DC-2 per square meter (0.75 L/m$^2$) of road surface. The DC-2 soaked into the dirt road portion completely and no mixing, compacting or tamping was required upon application. After application, the coated portion of road appeared wet, or darker in color than portions of the road where DC-2 was not applied.

Figure 7:
FIG. 7 is an image of trucks driving over a road comprising portions treated with a hydrophobizing agent and an oil in accordance with various aspects of the present disclosure, and portions which are not treated with a hydrophobizing agent and an oil.

Two weeks after application of DC-2, the coated portion of dirt road still appeared darker than portions of the road where DC-2 was not applied, but felt dry to the touch. The DC-2 had penetrated and completely covered the visible gravel and soil. Manually brushing around the road surface revealed no visibly uncoated or lighter spots. To visually test the road dust suppression properties of DC-2, multiple vehicles were driven over the uncoated and coated portions of the dirt road. As shown in FIG. 7, driving on uncoated portions of the road resulted in large amounts of dust being dispersed into the environment. In FIG. 7, the DC-2 was applied beginning at line 70. Relatively no dust was dispersed into the environment, on the other hand, as a result of driving on the portion of dirt road coated with DC-2.

Five months after the application of DC-2, the coated dirt road portion had been subjected to extreme weather such as cold temperatures, snow, rain, and chinooks (i.e., warm, moist westerly winds). After the five-month period, the coated road portion still appeared visibly darker than uncoated portions of the dirt road and continued to prevent the dispersal of fines and dust plumes when vehicles drove over the coated dirt road portion. Furthermore, it was observed the DC-2 coated dirt road portion directed snow melt and water flow away from the road rather than absorbing it, resulting in the integrity of the road being maintained.

Samples of the dirt road were obtained 1) prior to coating with DC-2, 2) two weeks after coating with DC-2, and 3) five months after coating with DC-2. Each sample was placed in water and agitated. FIG. 8A is an image of road sample 1), FIG. 8B is an image of road sample 2), and FIG. 8A is an image of road sample 3). As can be seen the untreated road sample exhibited murky, cloudy water due to the dispersion of fines in the water. The DC-2 coated samples, on the other hand produced clear, particle-free water due to the intergranular attraction of DC-2 coated neighboring fines.

Example 6—Road Testing

In this example, a mixture having 2 wt % hexadecylt-rimethoxysilane (Wacker Chemie AG) and 98 wt % HT-30 was applied onto a portion of a dry dirt road using a spray bar. The portion of dirt road was coating using a loading of about 0.75 Liters of the mixture per square meter (0.75 L/m$^2$) of road surface. The mixture soaked into the dirt road portion completely and no mixing, compacting or tamping was required upon application. After application, the coated portion of road appeared wet, or darker in color than portions of the road where mixture was not applied. The applied portion of the road was visually inspected, and qualitatively tested for dust suppression and granular attraction integrity via a touch test, over a period of eight weeks. The results of the eight-week test period are shown in Table 1.

TABLE 1

| WEEK # | VISUAL INSPECTION (1-5 scale; 5—dark brown, moist appearance; 1—light grey, dry appearance) | DUST SUPPRESSION (1-5 scale; 5—no dust in air after driving over road at 50 km/hr; 1—heavy amounts of dust in air after driving over road at 50 km/hr) | GRANULAR ATTRACTION INTEGRITY (1-5 scale; 5—aggregates and dust firmly stick together; 1—aggregates and dust do not stick together) |
|---|---|---|---|
| 1 | 5 | 5 | 5 |
| 2 | 5 | 4 | 4 |
| 3 | 5 | 4 | 4 |
| 5 | 5 | 4 | 4 |
| 7 | 5 | 4 | 4 |
| 8 | 4 | 3 | 3 |

Example 7—Continuous Exposure to Water

In this example, Dust Control Chemical DC-2 (example 1) was applied onto a road soil sample at a rate of 0.75 L/m$^2$. The DC-2 coated soil sample was collected and packed into a column. The column temperature was maintained at about 22° C. A 40 mL fresh water volume was then added to the column and circulated through the column at a rate of 20 mL/min. This process was repeated numerous times. After each 40 mL fresh water volume of water passed through the column (each volume of water equaling 1 water flush), the fluid was tested to calculate the amount of DC-2 released into the water over time. As shown in FIG. 9, essentially no DC-2 was lost in the water after 1,000 fresh water flushes through the column. This example therefore shows that DC-2 coated onto a road soil sample remains on said sample after at least 1,000 fresh water flushes.

STATEMENTS OF THE DISCLOSURE

Statements of the Disclosure include:

Statement 1: A method for suppressing fugitive dust, the method comprising binding a hydrophobizing agent to one or more of particulate materials and dust to form a hydrophobically coated material; and applying an oil to the hydrophobically coated material.

Statement 2: A method according to Statement 1, wherein the hydrophobizing agent is any one of an organosilane and a halosilane.

Statement 3: A method according to Statement 2, wherein the any one of an organosilane and a halosilane comprises at least one $C_8$-$C_{24}$ alkyl chain.

Statement 4: A method according to Statement 2 or 3, wherein the organosilane is hexadecyltrimethoxysilane.

Statement 5: A method according to Statement 1, wherein the hydrophobizing agent is a tallow alkyl amine.

Statement 6: A method according to Statement 1, wherein the hydrophobizing agent is a polysiloxane comprising any one of a primary amine, a secondary amine, a tertiary amine, and a quaternary amine.

Statement 7: A method according to Statement 6, wherein the polysiloxane has the following formula:

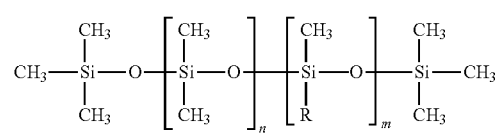

where R is an aminoalkyl group comprising a $C_1$-$C_{24}$ alkyl or alkenyl and a one or more primary, secondary, tertiary or quaternary amines, n is an integer ranging typically from 3-1000, and more typically from 10-500 and more typically from 20 to 200 and m is an integer ranging from 1-100, and more typically from 1 to 50.

Statement 8: A method according to Statement 6, wherein the polysiloxane has the following formula:

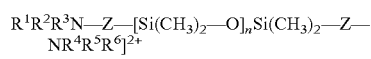

where $R^1$, $R^2$, $R^3$, $R^4$, $R^5$ and $R^6$ are independently alkyl or hydrogen, Z is —$CH_2$—CHOH—$CH_2$O—$(CH_2)_3$— and n is 1-200.

Statement 9: A method according to Statement 1, wherein the hydrophobizing agent is a hydrophobic polymer comprising any one of a primary amine, a secondary amine, a tertiary amine, and a quaternary amine.

Statement 10: A method according to Statement 1 or 9, wherein the hydrophobizing agent is an alkylamine-functionalized polyisobutylene (PIB) polymer having the following chemical formula:

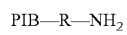

where R is a $C_3$ to $C_{12}$ carbon chain comprising at least one alkene group.

Statement 11: A method according to Statement 1, wherein the hydrophobizing agent is an amine having the following chemical formula:

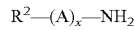

where $R^2$ is a linear or branched alkyl or alkenyl radical having 8-24 carbon atoms, A is an iminopropyl group, an oxyethyl group or an oxypropyl group, and x is an integer ranging from 0 to 10.

Statement 12: A method according to any one of Statements 1-11, wherein the one or more of particulate materials is located on a substrate, and the method further comprises binding the hydrophobizing agent to the substrate to form a hydrophobically coated substrate; and applying an oil to the hydrophobically coated substrate.

Statement 13: A method according to any one of Statements 1-12, wherein the oil is a mineral oil.

Statement 14: A method according to any one of Statements 1-12, wherein the oil is a vegetable oil.

Statement 15: A method according to any one of Statements 1-12, wherein the oil is a synthetic oil.

Statement 16: A method according to any one of Statements 1-15, wherein the hydrophobizing agent is physically bound to the one or more of particulate materials and dust.

Statement 17: A method according to any one of Statements 1-15, wherein the hydrophobizing agent is chemically bound to the one or more of particulate materials and dust.

Statement 18: A method for suppressing fugitive dust, the method comprising treating one or more of particulate materials and dust with a mixture comprising about 2 wt % to about 4 wt % of a hydrophobizing agent and about 96 wt % to about 98 wt % of an oil.

Statement 19: A method according to Statement 18, wherein the hydrophobizing agent is any one of an organosilane and a halosilane.

Statement 20: A method according to Statement 19, wherein the any one of an organosilane and a halosilane comprises at least one $C_8$-$C_{24}$ alkyl chain.

Statement 21: A method according to Statement 19 or 20, wherein the organosilane is hexadecyltrimethoxysilane.

Statement 22: A method according to Statement 18, wherein the hydrophobizing agent is a tallow alkyl amine.

Statement 23: A method according to Statement 18, wherein the hydrophobizing agent is a polysiloxane comprising any one of a primary amine, a secondary amine, a tertiary amine, and a quaternary amine.

Statement 24: A method according to Statement 23, wherein the polysiloxane has the following formula:

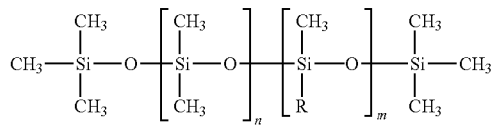

where R is an aminoalkyl group comprising a $C_1$-$C_{24}$ alkyl or alkenyl and a one or more primary, secondary, tertiary or quaternary amines, n is an integer ranging typically from 3-1000, and more typically from 10-500 and more typically from 20 to 200 and m is an integer ranging from 1-100, and more typically from 1 to 50.

Statement 25: A method according to Statement 23, wherein the polysiloxane has the following formula:

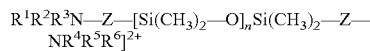

where $R^1$, $R^2$, $R^3$, $R^4$, $R^5$ and $R^6$ are independently alkyl or hydrogen, Z is —$CH_2$—CHOH—$CH_2$O—$(CH_2)_3$— and n is 1-200.

Statement 26: A method according to Statement 18, wherein the hydrophobizing agent is a hydrophobic polymer comprising any one of a primary amine, a secondary amine, a tertiary amine, and a quaternary amine.

Statement 27: A method according to Statement 18 or 26, wherein the hydrophobizing agent is an alkylamine-functionalized polyisobutylene (PIB) polymer having the following chemical formula:

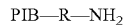

where R is a $C_3$ to $C_{12}$ carbon chain comprising at least one alkene group.

Statement 28: A method according to Statement 18, wherein the hydrophobizing agent is an amine having the following chemical formula:

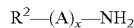

where $R^2$ is a linear or branched alkyl or alkenyl radical having 8-24 carbon atoms, A is an iminopropyl group, an oxyethyl group or an oxypropyl group, and x is an integer ranging from 0 to 10.

Statement 29: A method according to any one of Statements 18-28, wherein the one or more of particulate materials and dust is located on a substrate, and the method further comprises treating the substrate with the mixture.

Statement 30: A method according to any one of Statements 18-29, wherein the oil is a mineral oil.

Statement 31: A method according to any one of Statements 18-29, wherein the oil is a vegetable oil.

Statement 32: A method according to any one of Statements 18-29, wherein the oil is a synthetic oil.

Statement 33: A method according to any one of Statements 18-32, wherein the hydrophobizing agent is physically bound to the one or more of the particulate materials and the dust.

Statement 34: A method according to any one of Statements 18-32, wherein the hydrophobizing agent is chemically bound to the one or more of the particulate materials and the dust.

Statement 35: A method for suppressing dust emission from a substrate surface, the method comprising applying a mixture onto a surface of a substrate, the substrate surface having one or more of particulate materials and dust thereon, the mixture comprising a hydrophobizing agent; and an oil.

Statement 36: A method according to Statement 35, wherein the substrate is any one of a dirt road, a gravel road, a limestone-based road, a pathway, a worksite, a construction site, a shop yard, and a patch of land.

Statement 37: A method according to Statement 35 or 36, wherein the mixture is applied to the substrate surface by spray coating.

Statement 38: A method according to any one of Statements 35-37, wherein about 0.1 L to about 0.5 L of the mixture is applied per square meter of the substrate surface.

Statement 39: A method according to any one of Statements 35-38, wherein about 0.5 L to about 2 L of the mixture is applied per square meter of the substrate surface.

Statement 40: A method according to any one of Statements 35-39, wherein the mixture comprises about 2 wt % to about 4 wt % of the hydrophobizing agent and about 96 wt % to about 98 wt % of oil.

Statement 41: A method according to any one of Statements 35-40, wherein the hydrophobizing agent is any one of an organosilane and a halosilane.

Statement 42: A method according to Statement 41, wherein the any one of an organosilane and a halosilane comprises at least one $C_8$-$C_{24}$ alkyl chain.

Statement 43: A method according to Statement 41 or 42, wherein the organosilane is hexadecyltrimethoxysilane.

Statement 44: A method according to any one of Statements 35-40, wherein the hydrophobizing agent is a tallow alkyl amine.

Statement 45: A method according to any one of Statements 35-40, wherein the hydrophobizing agent is a polysiloxane comprising any one of a primary amine, a secondary amine, a tertiary amine, and a quaternary amine.

Statement 46: A method according to Statement 45, wherein the polysiloxane has the following formula:

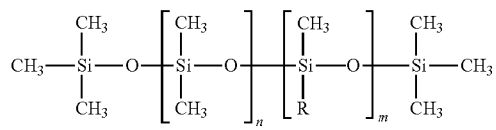

where R is an aminoalkyl group comprising a $C_1$-$C_{24}$ alkyl or alkenyl and a one or more primary, secondary, tertiary or quaternary amines, n is an integer ranging typically from 3-1000, and more typically from 10-500 and more typically from 20 to 200; and m is an integer ranging from 1-100, and more typically from 1 to 50.

Statement 47: A method according to Statement 45, wherein the polysiloxane has the following formula:

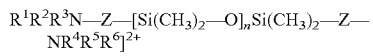

where $R^1$, $R^2$, $R^3$, $R^4$, $R^5$ and $R^6$ are independently alkyl or hydrogen, Z is —$CH_2$—CHOH—$CH_2O$—$(CH_2)_3$— and n is 1-200.

Statement 48: A method according to any one of Statements 35-40, wherein the hydrophobizing agent is a hydrophobic polymer comprising any one of a primary amine, a secondary amine, a tertiary amine, and a quaternary amine.

Statement 49: A method according to any one of Statements 35-40 or 48, wherein the hydrophobizing agent is an alkylamine-functionalized polyisobutylene (PIB) polymer having the following chemical formula:

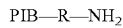

where R is a $C_3$ to $C_{12}$ carbon chain comprising at least one alkene group.

Statement 50: A method according to any one of Statements 35-40, wherein the hydrophobizing agent is an amine having the following chemical formula:

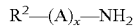

where $R^2$ is a linear or branched alkyl or alkenyl radical having 8-24 carbon atoms, A is an iminopropyl group, an oxyethyl group or an oxypropyl group, and x is an integer ranging from 0 to 10.

Statement 51: A method according to any one of Statements 35-50, wherein the oil is a mineral oil.

Statement 52: A method according to any one of Statements 35-50, wherein the oil is a vegetable oil.

Statement 53: A method according to any one of Statements 35-50, wherein the oil is a synthetic oil.

Statement 54: A method according to any one of Statements 35-53, wherein the hydrophobizing agent is physically bound to the one or more of the particulate materials and the dust.

Statement 55: A method according to any one of Statements 35-53, wherein the hydrophobizing agent is chemically bound to the one or more of the particulate materials and the dust.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter. Although particular embodiments of the present invention have been shown and described, they are not intended to limit what this disclosure. One skilled in the art will understand that various changes and modifications may be made without departing from the scope of this disclosure as literally and equivalently covered by the following claims.

What is claimed is:

1. A method for suppressing fugitive dust, the method comprising:
   a) physically or chemically binding a hydrophobizing agent, the hydrophobizing agent being a polysiloxane comprising an amine, to one or more of particulate materials and dust to form a hydrophobically coated material; and
   b) applying an oil selected from one or more of a mineral oil, a vegetable oil and a synthetic oil to the hydrophobically coated material,
   wherein the one or more of particulate materials and dust are located on a substrate,
   wherein, prior to physically or chemically binding a hydrophobizing agent to one or more of particulate materials and dust, the one or more of particulate materials and dust are capable of being suspended in air by wind action and/or human activities.

2. The method of claim 1, wherein the amine of the polysiloxane is any one of a primary amine, a secondary amine, a tertiary amine, and a quaternary amine.

3. The method of claim 2, wherein the polysiloxane has the following formula:

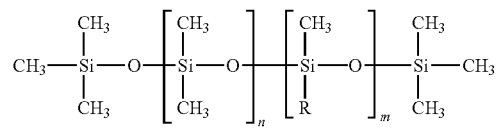

where R is an aminoalkyl group comprising a $C_1$-$C_{24}$ alkyl or alkenyl and one or more primary, secondary, tertiary or quaternary amines, n is an integer ranging from 3-1000, and m is an integer ranging from 1-100.

4. The method of claim 2, wherein the polysiloxane has the following formula:

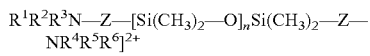

where $R^1$, $R^2$, $R^3$, $R^4$, $R^5$ and $R^6$ are independently alkyl or hydrogen, Z is —$CH_2$—CHOH—$CH_2O$—$(CH_2)_3$—, and n is 1-200.

5. The method claim 1, further comprising:
   binding the hydrophobizing agent to the substrate to form a hydrophobically coated substrate; and
   applying the oil to the hydrophobically coated substrate.

6. The method of claim 1, wherein the substrate is selected from the group consisting of dirt roads, gravel roads, limestone-based roads, pathways, worksite surfaces, construction site surfaces, shop yard surfaces, and patches of land.

7. The method of claim 1, wherein steps a) and b) are performed using a mixture comprising about 2 wt % to about 4 wt % of the hydrophobizing agent and about 96 wt % to about 98 wt % of the oil.

8. The method of claim 1, wherein the hydrophobizing is chemically bound to the one or more of particulate materials and dust to form the hydrophobically coated material.

9. The method of claim 1, wherein the hydrophobizing is physically bound to the one or more of particulate materials and dust to form the hydrophobically coated material.

10. A method for suppressing fugitive dust, the method comprising:
   a) physically or chemically binding a hydrophobizing agent, the hydrophobizing agent being a polysiloxane comprising an amine, to one or more of particulate materials and dust to form a hydrophobically coated material; and b) applying an oil selected from one or more of a mineral oil, a vegetable oil and a synthetic oil to the hydrophobically coated material, wherein the one or more of particulate materials and dust is located on a substrate, wherein, prior to physically or chemically binding a hydrophobizing agent to one or more of particulate materials and dust, the one or more of particulate materials and dust are capable of being suspended in air by wind action and/or human activities, and wherein the hydrophobizing agent and the oil are provided as a mixture comprising about 2 wt % to about 4 wt % of the hydrophobizing agent and about 96 wt % to about 98 wt % of the oil.

* * * * *